April 28, 1959
G. VEITCH, JR
2,883,838
COUPLING FOR SHAFTS AND THE LIKE
Filed Oct. 3, 1957
2 Sheets-Sheet 1
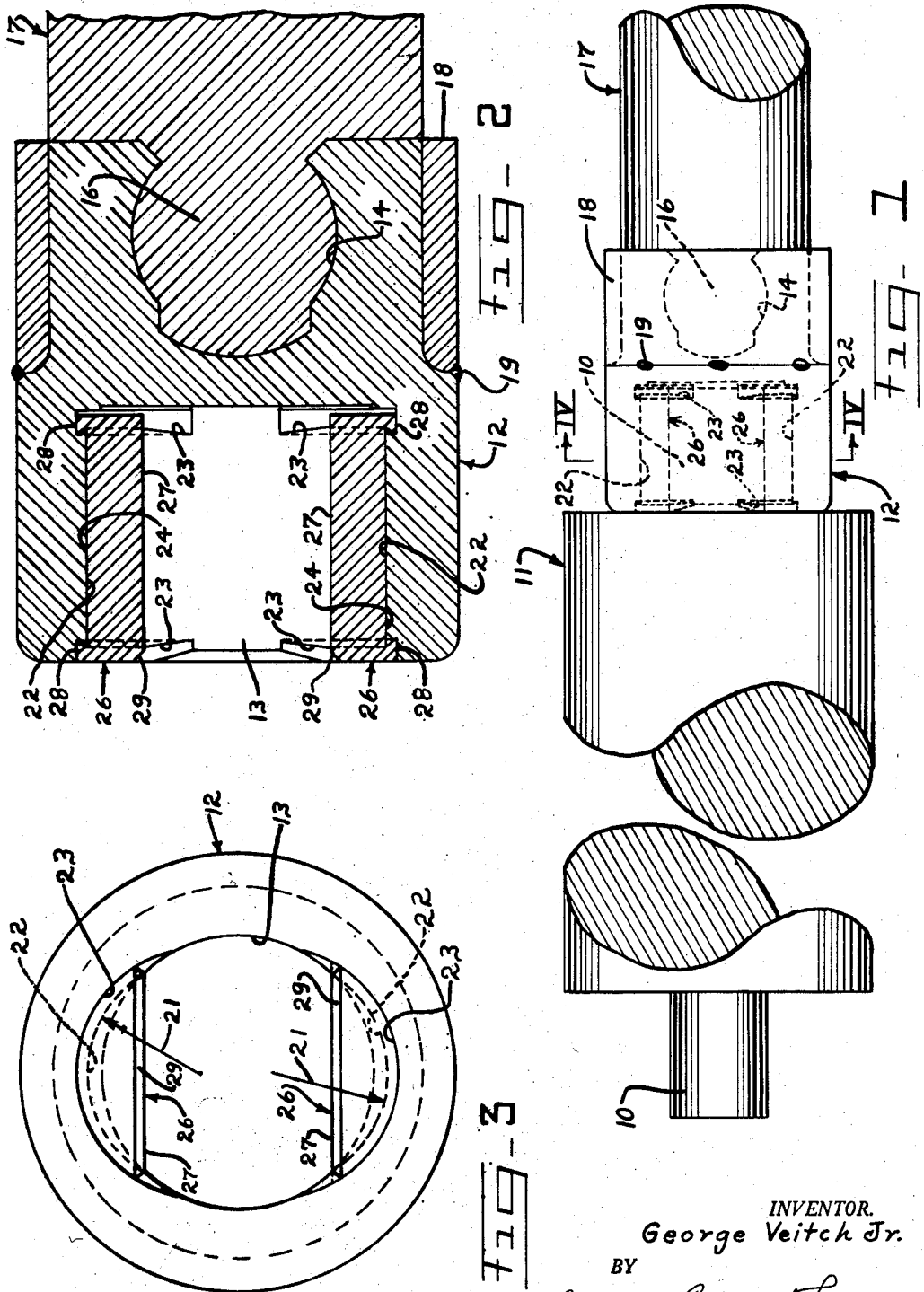
INVENTOR.
George Veitch Jr.
BY
Jennings Carter & Thompson
Attorneys

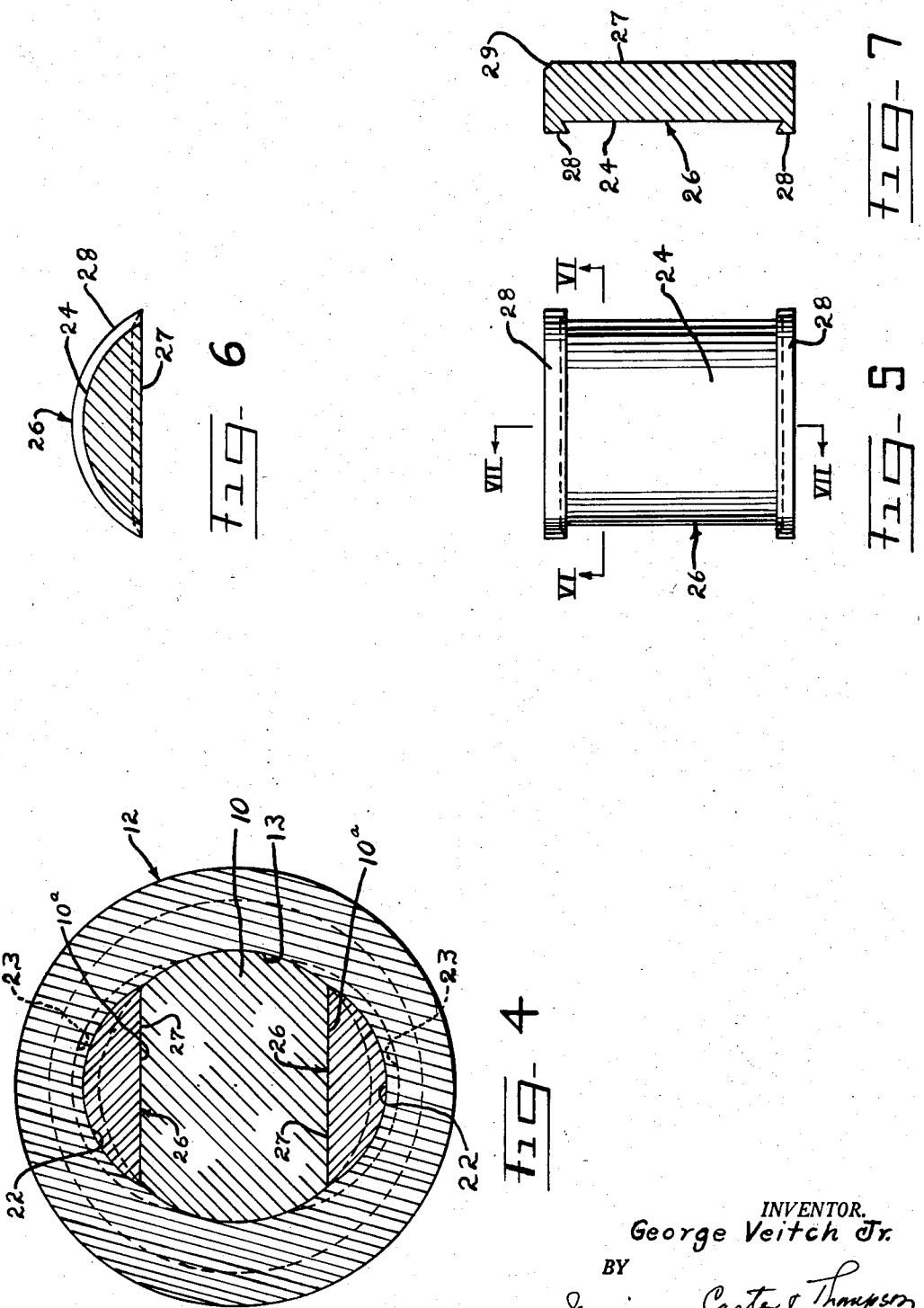

États-Unis Patent Office 2,883,838
Patented Apr. 28, 1959

2,883,838

COUPLING FOR SHAFTS AND THE LIKE

George Veitch, Jr., deceased, late of Fairfield, Ala., by Mattie Veitch, executrix, Fairfield, Ala., assignor to Robert L. Veitch and Leon U. Veitch Application October 3, 1957, Serial No. 688,061

6 Claims. (Cl. 64—7)

The invention relates to couplings for shafts, and relates particularly to a coupling by the use of which a power shaft may be coupled to the stub shaft of heavy rolls such as those used in the rolling of steel or the like.

An object of the invention is to provide a coupling of the character designated in which there are operatively interposed between the wall of the bore of the sleeve-like coupling member and the shaft arcuate shaped wedge blocks which are adapted to move toward each other upon slight relative rotation between the shaft and the coupling, thereby to grip the shaft and hold it against rotation relative to the coupling.

Another object is to provide a coupling of the character designated in which the wedge blocks are held in place by means of dove-tailed shaped sections thereon engageable with complementarily shaped notches, thus supporting the wedge blocks or clamping members for slight rotation on their respective seats.

Another object is to provide a coupling of the character designated in which the wedge blocks are mounted on seats which are struck on radii shorter than the radius of the bore of the coupling, both of the radii being struck on a diametral line passing through the bore, whereby the clamping action heretofore mentioned is obtained.

A still further object is to provide a coupling for connecting a power shaft in axial endwise relation to a shaft or the like in which there is a transversely extending slot in the coupling member to receive a complementarily shaped end of the power shaft, and in which there is a reinforcing and securing sleeve shrunk or otherwise closely fitted about that section of the coupling through which the slot is cut.

Briefly, the invention comprises a sleeve-like coupling member having a bore which extends from one end part way through the body of the coupling. Struck on radii lying on a diametral line passing through the center of the bore are arcuate seats. Adjacent the ends of these seats are undercut grooves. A pair of wedge blocks having flat inner faces and complementarily curved seat engaging surfaces is mounted on the seats. The wedge blocks also carry adjacent their ends arcuate portions which are dove-tail in transverse cross section and which fit in the dove-tail grooves. The wedge blocks thus are held in place but are free to rotate on their seats so that they will engage about the flats of a shaft in the bore to grip the same. The other end of the body of the coupling is provided with a transverse slot to receive the end of the power shaft. This section of the coupling is reinforced by a sleeve which is sweated or otherwise tightly placed about the coupling. The ring serves also to hold the power shaft in place in coupling body.

Apparatus illustrating features of the invention is shown in the accompanying drawing forming a part of this application in which:

Fig. 1 is a side elevational view, partly broken away and in section, showing the improved coupling applied to the projecting end of a roll shaft;

Fig. 2 is an enlarged detail longitudinal sectional view;
Fig. 3 is an end view;
Fig. 4 is a detail sectional view taken on line IV—IV of Fig. 1 and drawn to a larger scale;
Fig. 5 is a view of one of the wedge blocks removed from the coupling, the view showing the wedge block as it appears from its curved or seat side;
Fig. 6 is a detail sectional view taken generally along line VI—VI of Fig. 5; and,
Fig. 7 is a detail sectional view taken generally along line VII—VII of Fig. 5.

Referring now to the drawings for a better understanding of the invention the improved coupling is shown associated with the projecting stub shaft 10 of a rolling mill roll 11. As is well understood, the stub shaft 10 has flats 10a on opposite sides thereof. These flats serve as means to grip the shaft by the coupling now to be described.

The improved coupling comprises a body portion indicated generally by the numeral 12 and which has a bore 13 therein. The bore 13 is of a diameter to fit snugly over the shaft 10. As shown, the bore 13 extends only part way through the body portion 12. At the opposite end, the body is provided with a transversely disposed slot 14 which is adapted to receive the end 16 of a power shaft 17. In order to give slight universal action the groove 14 in the shaft end 16 may be configured substantially as shown.

Fitting tightly about the part of the body 12 surrounding the slot 14 is a sleeve 18. The sleeve 18 may be sweated or otherwise tightly pressed onto the body 12 as shown and may be held in place by tack welds 19.

Struck on radii 21 as shown more clearly in Fig. 3 are arcuate seats 22. The radii are struck on a diametral line passing through the center of the bore 13 and the radii preferably are shorter than the radius of the bore proper. Adjacent the ends of the seats are undercut or dove-tail shaped grooves 23. Adapted to fit with their arcuate sides 24 on the seats 22 are wedge blocks indicated generally by the numeral 26. The wedge blocks have flat inner faces 27. Adjacent the ends of the wedge blocks are arcuate projecting sections 28 which are dove-tail as clearly shown in the drawings, thereby to fit in the dove-tail grooves 23. The wedge blocks may be chamfered as at 29 along the flat surface of the outer ends thereof as shown in the drawings thus to facilitate the insertion of the shaft into the assembly.

From the description so far given the method of constructing and using the improved coupling together with the advantages thereof may now be readily understood. With the device constructed as shown the shaft 10 is inserted with its flats coacting with the flat surfaces 27 of the wedge blocks. With the power shaft applied and secured in place as shown by the sleeve 18 it will be apparent that upon very slight relative rotation between the shaft 10 and the wedge blocks 26 the latter shift or slide slightly on the seats 22, thus clamping the shaft 10 tightly between them. It will be apparent that the more power is applied the tighter the blocks wedge or clamp about the shaft 10. The dove-tail groove and cooperating gib arrangement holds the blocks in place when the shaft is removed. It will further be apparent that in order to remove the shaft it is only necessary to rotate the roll a very slight amount in the direction opposite its driving direction, whereby the coupling may be slipped off without any difficulty.

From the foregoing it will be apparent that there has been devised an improved coupling for transmitting power to shafts. The invention is particularly applicable to those instances wherein the rolls or the like driven by the shafts or the shafts themselves must be replaced often. The invention provides a quick detachable, efficient coupling for transmitting power to such shafts. The invention has proved to be extremely satisfactory for use in driving rolling mill rolls and similar heavy pieces of machinery. In actual practice the invention has been found to be economical of production and efficient in operation for its intended purposes.

While the invention is shown in but one form it will be obvious to those skilled in the art that it is not so limited but is susceptible of various changes and modifications without departing from the spirit thereof, and it is desired, therefore, that only such limitations shall be placed thereupon as are specifically set forth in the appended claims.

What is claimed is:

1. In a coupling for a shaft having diametrically opposed flats adjacent its end, a sleeve having a bore therein of a diameter to fit snugly over the shaft end, a pair of diametrically opposed arcuate seats struck on radii shorter than the radius of the sleeve bore and on centers located on a diametral line passing through the center of the bore, gripping blocks having flat inner surfaces complementary with the shaft flats and outer arcuate surfaces complementary with the seats, whereby upon relative rotation between the shaft and sleeve the blocks move into wedging engagement between the shaft and sleeve, and means holding the blocks against dropping out of the seats when the shaft is withdrawn from the bore.

2. Apparatus as defined in claim 1 in which the means holding the blocks against dropping out of the seats comprises arcuate undercut gibs thereon and complementary arcuate undercut grooves in the seats into which the gibs fit.

3. Apparatus as defined in claim 2 in which the gibs are located adjacent the ends of the blocks.

4. In a coupling for shafts and the like, a sleeve having a bore of a diameter to fit snugly over the shaft to be coupled, arcuate diametrically opposed seats in the wall of the sleeve bore, said seats being of a radius shorter than the radius of the bore and both being struck from points lying on a line passing through the center of the bore, shaft gripping members having inner gripping surfaces for engaging the shaft surfaces and outer arcuate surfaces corresponding to the seats and in engagement therewith, arcuate locking sections on the gripping members dove-tailed as viewed in transverse section, there being arcuate transversely dove-tailed grooves in the slots receiving the locking sections, whereby the gripping members move into contact with the shaft upon relative rotation between the shaft and sleeve.

5. The combination with a power driven shaft arranged in endwise relation to the end of a second shaft having diametrically opposed flats on the end thereof to be coupled, of a coupling member having a bore extending partially therethrough and adapted to fit snugly over the end of the second shaft, diametrically opposed arcuate seats formed in the wall of the bore, and arcuately curved clamping members on said seats having flats on the inner surface thereof adapted to coact with the flats on the second shaft, there being a transversely extending slot in the end of said coupling member opposite the bore adapted to receive a complementarily shaped end of the power shaft.

6. Apparatus as defined in claim 5 in which there is a reinforcing sleeve surrounding that part of the coupling member which is adapted to receive the end of the power shaft.

References Cited in the file of this patent
UNITED STATES PATENTS

| | | |
|---|---|---|
| 469,780 | Ferres | Mar. 1, 1892 |
| 876,052 | Haskins | Jan. 7, 1908 |
| 1,011,422 | Fernandez | Dec. 12, 1911 |
| 2,386,630 | O'Malley | Oct. 9, 1945 |

FOREIGN PATENTS

| | | |
|---|---|---|
| 262,144 | Great Britain | Mar. 31, 1927 |